United States Patent [19]

Polzer

[11] Patent Number: 4,848,888
[45] Date of Patent: Jul. 18, 1989

[54] INSIDE REAR-VIEW MIRROR FOR A VEHICLE

[75] Inventor: Herwig W. Polzer, Miltenberg, Fed. Rep. of Germany

[73] Assignee: Hohe KG, Collenberg, Fed. Rep. of Germany

[21] Appl. No.: 116,849

[22] Filed: Nov. 5, 1987

[30] Foreign Application Priority Data

Nov. 5, 1986 [DE] Fed. Rep. of Germany ... 8629506[U]

[51] Int. Cl.$^4$ ............................ G02B 7/18; B60R 1/04
[52] U.S. Cl. .................................... 350/631; 248/549; 248/900; 350/632
[58] Field of Search ............... 248/475.1, 549, 900; 350/631, 632, 639

[56] References Cited

U.S. PATENT DOCUMENTS

| | | | |
|---|---|---|---|
| 2,495,123 | 1/1950 | Morley | 248/549 |
| 3,425,657 | 2/1969 | Doyle | 248/549 |
| 3,589,662 | 6/1971 | Lagrange | 248/549 |
| 3,596,867 | 8/1971 | Allander | 248/549 |
| 4,012,022 | 3/1977 | Tomita | 248/549 |
| 4,066,235 | 1/1978 | Hashiguchi | 248/549 |
| 4,243,196 | 1/1981 | Toda et al. | 248/475.1 |

FOREIGN PATENT DOCUMENTS

| | | |
|---|---|---|
| 2539681 | 3/1977 | Fed. Rep. of Germany ...... 248/549 |
| 2947512 | 11/1979 | Fed. Rep. of Germany . |
| 3234157 | 9/1982 | Fed. Rep. of Germany . |
| 1123290 | 8/1968 | United Kingdom ............... 248/549 |
| 1211222 | 11/1970 | United Kingdom ............... 248/549 |
| 1219173 | 1/1971 | United Kingdom ............... 248/549 |
| 1224875 | 3/1971 | United Kingdom ............... 248/549 |
| 1522556 | 8/1978 | United Kingdom ............... 248/549 |

Primary Examiner—Rodney B. Bovernick
Assistant Examiner—Martin Lerner
Attorney, Agent, or Firm—Fleit, Jacobson, Cohn, Price, Holman & Stern

[57] ABSTRACT

The invention provides an inside rear-view mirror for a car which comprises a mirror arm projecting to the interior of the car and having a base which may be mounted releasably to a supporting plate fastened to the car body or the windshield of the car. The lower free end of the arm supports a mirror housing. For suppressing any vibrations of the mirror housing caused by the running car engine, a supporting leg is provided which projects in spaced relationship to the upper base of the arm towards the windshield or the car body and is adhered thereto. Upon impact above a predetermined threshold the supporting leg may collapse.

18 Claims, 1 Drawing Sheet

INSIDE REAR-VIEW MIRROR FOR A VEHICLE

FIELD OF THE INVENTION

The invention refers to an inside rear-view mirror for a vehicle. The rear-view mirror has a base which may be mounted releasably to a supporting plate and fastened to the car body or to the windshield of the vehicle, has an arm which projects from the base into the interior of the car, the free end of which supports a mirror housing.

BACKGROUND OF THE INVENTION

Within the mirror housing of the inside rear-view mirror of a car, the control mechanism for switching the mirror glass from a full reflectance position to a partial reflectance position includes a set motor and various other heavy components. Moreover, the mirror housing is additionally equipped with indicators (West German Published Patent Application No. 32 34 157), the displays and associated electronic control of which add to the weight of the completely equipped mirror housing. Usually, the mirror housing is pivotably supported by a free end of an arm which projects into the interior of the car and the base of which is releasably mounted on a supporting plate provided on an upper portion of the car body or on the inner surface of the windshield (West German Published Patent Application No. 29 47 512).

It is a drawback of such inside rear-view mirrors that vibrations of the car body caused by the running engine are transmitted to the mirror arm and lead to corresponding vibrations of the mirror glass within the mirror housing. Due to the increased weight of the mirror housing, the characteristic frequency of the inside rear-view mirror is shifted to a lower frequency, which causes vibrations of increasing amplitudes. This not only reduces the safety and reliability of the mounting of the inside rear-view mirror, but also substantially obscures a clear and steady rear view seen in the mirror.

SUMMARY OF THE INVENTION

It is therefore an object of the invention to provide an improved inside rear-view mirror which is substantially impervious to vibrations of the mirror housing.

According to the invention the inside rear-view mirror has a base which may be releasably mounted to a supporting plate fastened to the windshield or the car body. This inside rear-view mirror also has an arm which projects from the base into the interior of the car, the free end of which supports a mirror housing. Spaced from the base of the arm, a supporting leg projects from the arm and abuts the car body or the windshield and collapses by an impact exerted on the arm or the mirror housing when the impact exceeds a predetermined threshold. The supporting leg adheres the arm to the car body or the windshield with respect to possible oscillations to dampen vibration of the mirror housing and the mirror glass during normal engine operation. Moreover, the inside rear-view mirror meets the safety demands for a car in view of the collapsible supporting leg.

According to a preferred aspect of the invention, the supporting leg includes a slidable coupling between a trunnion and a sleeve coaxially surrounding the trunnion. The slidable coupling fixes the sleeve adhering the car body or the windshield to the trunnion, yet allows the supporting leg to collapse upon impact of sufficient magnitude.

The sleeve is preferably made of plastic material. In order to increase the permanency of the mounted sleeve on the trunnion in case the plastic material softens under the influence of long-time solar radiation, the end portion of the sleeve close to the trunnion is provided with a radially resilient ring. Moreover, the sleeve preferably may be slit axially along a portion of its length. The provision of such a resilient ring on the slit end portion of the sleeve is particularly desirable, when in accordance with a further embodiment of the invention, the trunnion is provided with a male thread and the sleeve, at least its end portion, has a female thread so that the sleeve may be screwed on the trunnion. The threaded sleeve and trunnion allow adjustment of the length of the supporting leg such that the arm effectively may be supported upon the car body or the windshield. Upon impact, the female thread of the sleeve rides over and along the male thread of the trunnion for allowing the supporting leg to collapse.

According to a further preferred aspect of the invention, the open end of the sleeve opposite to the trunnion is closed by a cap, the flat outer surface of which may adhere to the windshield.

According to yet another preferred aspect of the invention, the trunnion and the slit end portion of the sleeve are surrounded by a jacket formed from yielding plastic material integral with a plastic shell of the arm.

BRIEF DESCRIPTION OF THE DRAWING

The above, as well as other objects, advantages, and characteristics of the present invention, will become apparent from the following description of a preferred embodiment thereof with reference to the accompanying drawing.

DESCRIPTION OF THE PREFERRED EMBODIMENTS

Figure 1:
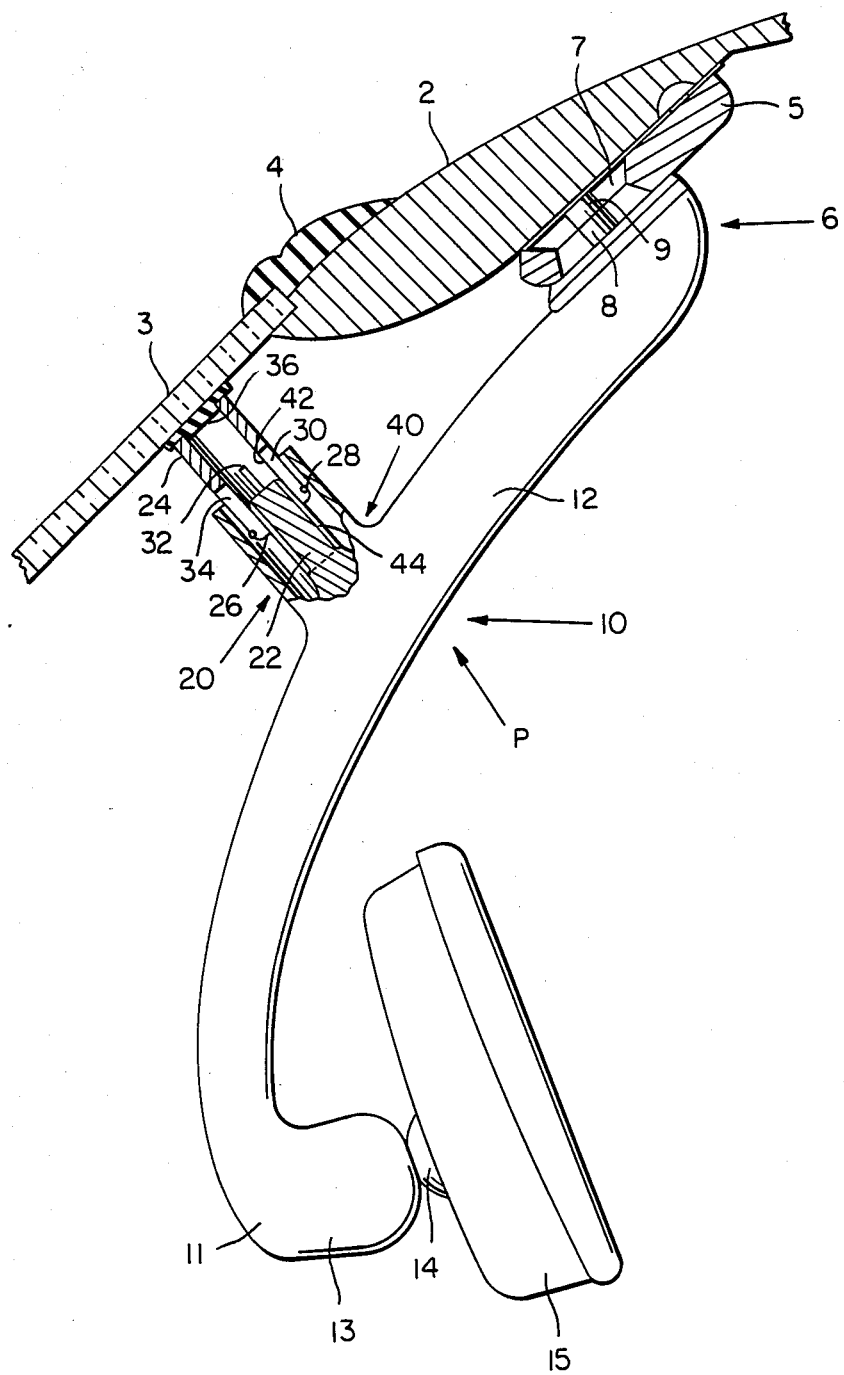

The drawing shows an inside rear-view mirror which may be mounted and utilized within a car. Schematically shown is the traverse member 2 of the car body above the opening for the windshield 3. Upon the traverse member 2, the windshield 3 is fastened in usual fashion. A sealing weather stripping 4 covers the transition from the windshield 3 to the car body. The inside rear-view mirror 10 is mounted to the inner side of the traverse member 2, as shown specifically in the description of West German Published Patent Application No. 29 47 512, the disclosure of which is hereby incorporated by reference. Thus, a supporting plate 5 is screwed to the inner side of traverse member 2 and has an opening 7 with resilient elements, not shown in the drawing. Female part 9 allows insertion and detachable holding of the mirror arm 12. The upper base 6 of the mirror arm 12 is provided with an abutment surface opposite to the supporting plate 5. A male part 8 projects from the abutment surface and is adapted to be inserted into the opening 7 of the female part 9. After a 60° rotation of the arm 12, portions of the male part 8 are clamped behind the resilient elements so that the mirror arm 12 is held by said elements and is released therefrom upon impact. The invention, however, is not limited to the specific structure of the mounting of the mirror arm 12 to the supporting plate 5. Instead, a different catch lock may be retained without departing from the invention which releases the mirror arm 12 upon impact.

The mirror arm 12 may be made out of a light alloy or light metal and is bent away from the windshield 3 and the traverse member 2 along the greatest portion of its length. The lower free end 11 of the mirror arm 12 is formed with a stud 13 directed into the interior of the car from the side of the mirror arm 12 opposite to the male part 8. The stud 13 terminates in a ball 14, onto which the mirror housing 15 is pivotably clamped. The mirror housing 15 surrounds the mirror glass, the bearing thereof, and the control means for switching the mirror glass from a full reflecting position to a partial reflecting position and vice versa. Moreover, the mirror housing may include, if desired, a display and associated electronic circuitry, the supply current lines extending through the ball 14 and the hollow mirror arm 12 and the opening 7 in the supporting plate 5.

An intermediate section of the mirror arm 12 is provided with a supporting leg 20 projecting from the same side of the mirror arm 12 as the male part 8 towards the windshield 3. The supporting leg 20 comprises substantially a trunnion 22 formed from the mirror arm 12 and is provided with an exterior male thread and a sleeve 24 made from plastic material. The leading end portion 26 of sleeve 24 close to the trunnion 22 is coupled slidably to the periphery of trunnion 22. The end portion 26 is therefore provided with an interior female thread 42 corresponding to the male thread 44 of trunnion 22. The contour of the end portion 26 is circumferentially gripped by a spring ring 28 embedded within a suitable groove in the outer contour of sleeve 24. The spring ring 28 ensures effective engagement of the female thread of sleeve 24 with the male thread of the trunnion 22. Moreover, the sleeve 24 is provided with a plurality of circumferentially equally spaced incuts extending from the end portion 26 over approximately half the length of the sleeve 24. The drawing shows three such incuts 30, 32, 34. The open end of the sleeve 24 opposite to the end portion 26 is closed by a cap 36 of rubber material or the like, the outer flat surface of which abuts the inner side of the windshield 3. In view of the flat outer surface of the cap 36 and the flat inner surface of the windshield 3, cap 36 adheres to the windshield 3, thereby mounting sleeve 24 thereto. The length of the supporting leg 20 may be adjusted to the desired distance between the mirror arm 12 and the inner surface of windshield 3 by turning the sleeve 24 together with cap 36 on the trunnion 22.

From the foregoing, it will be understood that the intermediate section of the mirror arm 12, which is spaced from the base 6 thereof, is supported on the windshield such that any vibrations of said section are minimized. Thus, the remaining length of mirror arm 12 from the supporting leg 20 to the free end 13 of the mirror arm 12 is sufficiently short to prevent vibration of the unsupported free lower portion of the mirror arm 12.

In the event the mirror housing 15 or the mirror arm 12 are hit in direction of the arrow P to a degree above the threshold determined by the resilient force of the spring ring 28 and the radial elasticity of the sleeve portions in between the incuts 30, 32, 34, the threads of the sleeve 24 and the trunnion 22 are released from the mutual engagement and the end portion 26 rides along the trunnion 22 toward the mirror arm 12. As a result, the mirror arm 12 moves towards the windshield 3 against the frictional force of the end portion 26 on the trunnion 22 so that the support leg 20 collapses telescopically.

In the shown preferred embodiment of the inside rear-view mirror, the mirror arm 12 is embedded within a plastic shell made of relatively soft plastic material. A jacket 40 is formed on the plastic shell surrounding the trunnion 22 in radially spaced relationship. The length of the jacket 40 corresponds approximately to the length of the trunnion 22 so that the end portion 26 of sleeve 24 is retained within the intermediate space between trunnion 22 and jacket 40 without being impeded by the jacket 40.

While a preferred embodiment of the invention has been illustrated and described, it will be understood that various changes and modifications may be made without departing from the spirit of the invention, as defined in the appended claims.

What is claimed is:

1. Inside rear-view mirror for a vehicle, said rear-view mirror comprising:

a mirror arm projecting into the interior of the vehicle and having a base which may be mounted releasably to a supporting plate fastened to a car body or to a windshield and having a free end supporting a mirror housing, a supporting leg projecting from said mirror arm towards the car body or the windshield in spaced relationship to the base, said supporting leg being adapted to collapse upon impact above a predetermined threshold, said supporting leg including an axially slidable coupling between a trunnion projecting from said mirror arm and a sleeve coaxially surrounding and engaging said trunnion, said coupling including means for holding with a predetermined amount of force an adjusted relative positioning between said trunnion and said sleeve and for sliding of said trunnion within said sleeve upon overcoming said predetermined amount of force by impact of said mirror arm.

2. Inside rear-view mirror according to claim 1 wherein said sleeve is made of plastic material.

3. Inside rear-view mirror according to claim 1, wherein said sleeve is provided with circumferentially equally spaced incuts extending from an end portion of said sleeve close to said trunnion over at least a portion of its length.

4. Inside rear-view mirror according to claim 1, wherein an open end of said sleeve opposite to said trunnion is closed by a cap made of plastic material, a flat outer surface thereof being adapted to rest adheringly on an inner side of the windshield.

5. Inside rear-view mirror according to claim 1, wherein a length of said supporting leg is adjustable.

6. Inside rear-view mirror according to claim 5, wherein said trunnion is provided on its periphery with a male thread and wherein said sleeve, at least at an end portion thereof close to said trunnion, is provided with a corresponding female thread for engagement with said male thread of said trunnion.

7. Inside rear-view mirror according to claim 1, wherein said supporting leg is surrounded with radial clearance by a jacket formed from yielding plastic material and extending over at least a portion of a length of said supporting leg from said arm.

8. Inside rear-view mirror according to claim 7, wherein said jacket is integral with a shell of said mirror arm.

9. Inside rear-view mirror for a vehicle, said rear-view mirror comprising:

a mirror arm projecting into the interior of the vehicle and having a base which may be mounted releasably to a supporting plate fastened to a car body or to a windshield and having a free end supporting a mirror housing, a supporting leg projecting from said motor arm towards the car body or the windshield in spaced relationship to the base, said supporting leg being adapted to collapse upon impact above a predetermined threshold, said supporting leg including a slidable coupling between a trunnion projecting from said mirror arm and a sleeve coaxially surrounding said trunnion, an end portion of said sleeve close to said trunnion being radially retained by a spring ring embedded in a circumferential groove of said sleeve.

10. Inside rear-view mirror according to claim 9, wherein aid sleeve is made of plastic material.

11. Inside rear-view mirror according to claim 9, wherein said sleeve is provided with circumferentially equally spaced incuts extending from said end portion of said sleeve close to said trunnion over at least a portion of its length.

12. Inside rear-view mirror according to claim 9, wherein an open end of said sleeve opposite to said trunnion is closed by a cap made of plastic material, a flat outer surface thereof being adapted to rest adheringly on an inner side of the windshield.

13. Inside rear-view mirror according to claim 9, wherein a length of said supporting leg is adjustable.

14. Inside rear-view mirror according to claim 13, wherein said trunnion is provided on its periphery with a male thread and wherein said sleeve, at least at an end portion thereof close to said trunnion, is provided with a corresponding female thread for engagement with said male thread of said trunnion.

15. Inside rear-view mirror according to claim 9, wherein said supporting leg is surrounded with radial clearance by a jacket formed from yielding plastic material and extending over at least a portion of a length of said supporting leg from said mirror arm.

16. Inside rear-view mirror according to claim 15, wherein said jacket is integral with a plastic shell of said mirror arm.

17. A rear view mirror for a vehicle, said rear-view mirror comprising:
a mirror arm projecting into the interior of the vehicle and having a base end mounted on the vehicle and a free end supporting a mirror housing,
a supporting leg projecting from said mirror arm and being mounted on the vehicle, said supporting leg including a first portion fixed to said mirror and a second portion extending coaxially with said first portion and rotatably mounted at one end on the vehicle and threadingly engaging said first portion at its opposite end for adjustment of said mirror arm with respect to the vehicle, said first portion being axially slidable with respect to said second portion upon impact of said mirror arm.

18. Inside rear-view mirror for a vehicle, said rear-view mirror comprising:
a mirror arm projecting into the interior of the vehicle and having a base which may be mounted releasably to a supporting plate fastened to a car body or to a windshield and having a free end supporting a mirror housing, a supporting leg projecting from said mirror arm towards the car body or the windshield in spaced relationship to the base, a length of said supporting leg being adjustable and said supporting leg being adapted to collapse upon impact above a predetermined threshold, said supporting leg including an axially slidable coupling between a trunnion projecting from said mirror arm and a sleeve coaxially surrounding said trunnion, said trunnion being provided on its periphery with a male thread and wherein said sleeve, at least at an end portion thereof close to said trunnion, being provided with a corresponding female thread for engagement with said male thread of said trunnion.

* * * * *